United States Patent
Boekeloo et al.

[11] Patent Number: 6,038,774
[45] Date of Patent: Mar. 21, 2000

[54] SPRINKLER HEAD TRIMMER

[75] Inventors: Harry F. Boekeloo; James A. Swick, both of Warren, Pa.

[73] Assignee: Boekeloo, Inc., Warren, Pa.

[21] Appl. No.: 09/118,948

[22] Filed: Jul. 17, 1998

Related U.S. Application Data

[60] Provisional application No. 60/052,957, Jul. 18, 1997.

[51] Int. Cl.[7] .................................................. B26B 27/00
[52] U.S. Cl. .................................. 30/276; 30/347; 172/13
[58] Field of Search ....................... 30/276, 347, DIG. 5, 30/264; 56/12.5, 12.7; 172/13–15

[56] References Cited

U.S. PATENT DOCUMENTS

| | | |
|---|---|---|
| 2,615,246 | 10/1952 | Littig . |
| 3,028,669 | 4/1962 | Caskey et al. . |
| 3,127,939 | 4/1964 | Rink . |
| 3,143,176 | 8/1964 | Drane, Jr. . |
| 3,174,224 | 3/1965 | Rousselet . |
| 3,555,680 | 1/1971 | Ford . |
| 3,747,213 | 7/1973 | Green et al. . |
| 3,905,103 | 9/1975 | Ford et al. . |
| 3,938,249 | 2/1976 | Chacon . |
| 4,249,310 | 2/1981 | Secoura et al. ........................ 30/276 |
| 4,357,752 | 11/1982 | Goodwin, Jr. . |
| 4,547,966 | 10/1985 | Eden . |
| 4,805,389 | 2/1989 | Hawkenson ...................... 56/12.7 X |
| 4,832,131 | 5/1989 | Powell et al. . |
| 5,025,615 | 6/1991 | Hawkenson ...................... 56/12.7 X |
| 5,493,783 | 2/1996 | Oostendorp . |

*Primary Examiner*—Douglas D. Watts
*Attorney, Agent, or Firm*—James C. Simmons

[57] ABSTRACT

Apparatus for trimming grass around a sprinkler head. The apparatus comprises a body rotatable about a vertical axis and having a bore for fitting over a sprinkler head during rotation thereof and a peripheral portion surrounding the bore. At least one cutter attached to the peripheral portion and comprising a wire having an end portion defining a cutting blade and preferably an intermediate portion formed into a coil defining a spring which allows protective movement of the cutting blade when an obstacle is encountered. The cutting blade extends downwardly at an angle relative to the rotational axis, preferably radially inwardly.

21 Claims, 2 Drawing Sheets

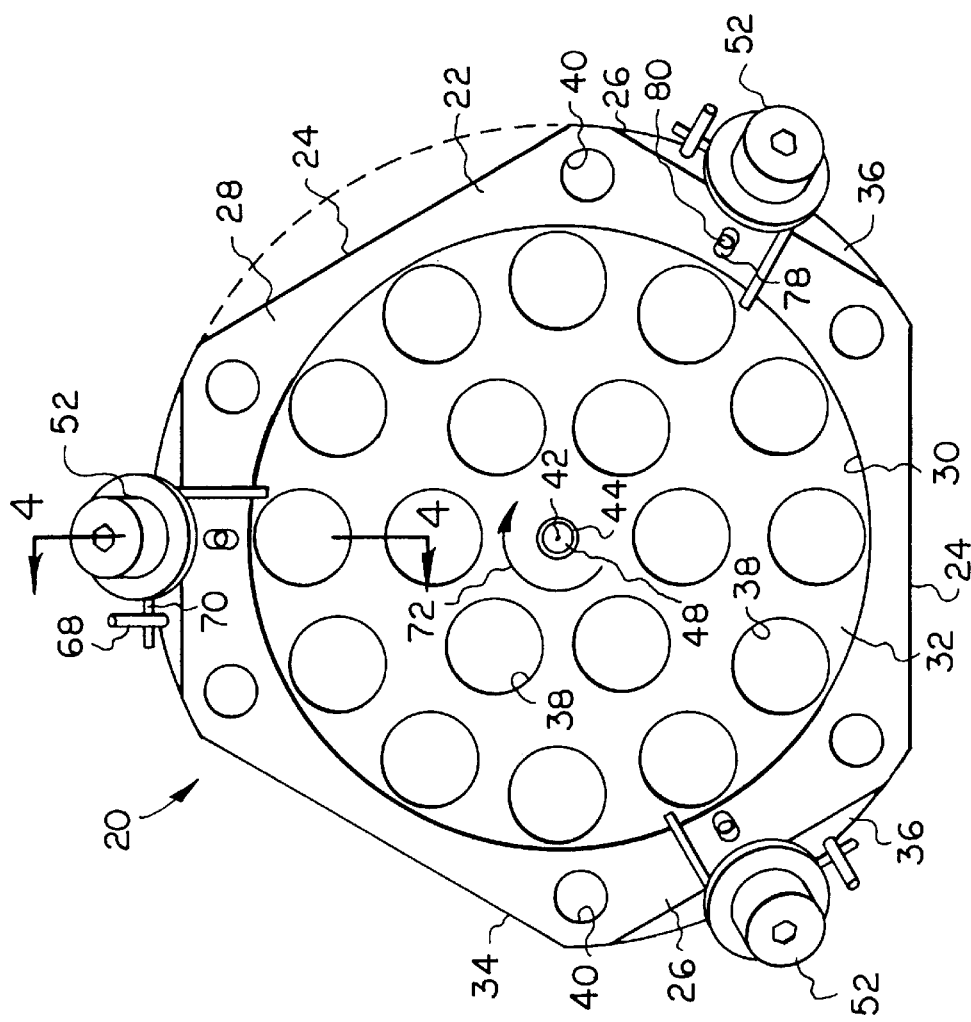
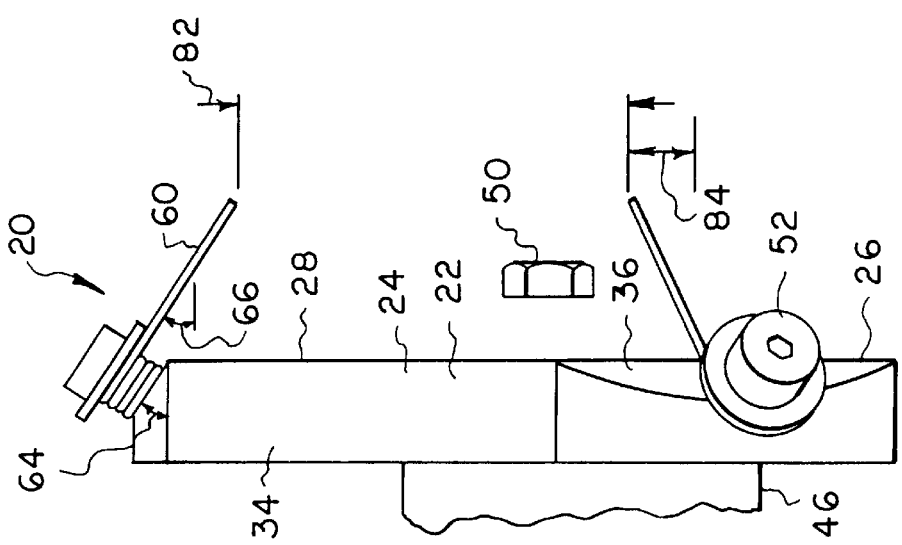
FIG. 2
FIG. 3

SPRINKLER HEAD TRIMMER

Priority of U.S. provisional patent application serial No. 60/052,957, filed Jul. 18, 1997, which is hereby incorporated herein by reference, is hereby claimed.

The present invention relates generally to grass trimmers. More particularly, the present invention relates to devices for trimming the grass around sprinkler heads on, for example, golf courses.

Manually trimming the grass around typically 20 sprinkler heads on each of 9 fairways using a knife or hand tool may typically take two persons all day. It is considered desirable to reduce the amount of labor required for such work.

A grass or weed wacker attachment, illustrated at 10 in FIG. 1, has been provided for grass trimming around sprinkler heads. This attachment has a plate portion 12 which has an aperture 14 centrally thereof. In order to mount the plate to the motor unit of the grass wacker for rotation thereof, the existing grass wacking device is removed by removing a nut then the device from a stud which is attached to the motor unit. The stud is then received in the aperture 14 and the nut tightened thereon so that the attachment 10 is rotatable as illustrated at 16. The grass wacker motor unit with the attachment 10 attached is held over a sprinkler head with the plate portion 12 horizontal and is rotated for trimming the grass around the sprinkler head. The attachment 10 is formed to have two blades 18 (which may be plate portions) which extend downwardly from the opposite ends of the plate portion 12 respectively, the blades 18 being normal to plate portion 12. This attachment, being composed of steel or other metal, may damage the sprinkler head if it were to accidentally come into contact with it. Furthermore, the thin blades trim over a very narrow path around a sprinkler head and therefore may fail to cut all of the grass which it is necessary or desired to cut.

Art which may be of interest includes U.S. Pat. Nos. 2,615,246; 3,028,669; 3,127,939; 3,143,176; 3,174,224; 3,555,680; 3,747,213; 3,905,103; 3,938,249; 4,357,752; 4,547,966; 4,832,131; and 4,493,783.

U.S. Pat. No. 4,357,752 discloses a sprinkler head grass clipper which is attachable to a lawn trimmer rotor and which includes a cylindrical body which has an inner cylindrical wall providing a recess to fit over and engage a sprinkler head to maintain the body in a clipping position during rotation of the rotor, and a plurality of diametrically opposed cutter wires extending between the top and the bottom portions of the body to project outwardly of the body to clip grass located adjacent the periphery of the sprinkler head. Each wire projects outwardly of the body to a progressively greater degree in an upward direction whereby it is stated that the diameter of the grass area clipped by the wires increases as the body is moved downwardly relative to the sprinkler head. The closeness of the wall to the sprinkler head may cause damage thereto.

U.S. Pat. No. 5,493,783 discloses a sprinkler head grass trimming device which includes three evenly spaced blade members on the underside and about the perimeter of the device, which is connectable to a lawn trimmer for rotation. The blade members have downwardly extending blades. Contact of the blade members with sprinkler heads may result in damage thereto.

U.S. Pat. No. 3,747,213 discloses a device for trimming grass adjacent a sprinkler head comprising a rotor carried by a shaft and carrying a series of downwardly presented cutters circularly spaced about the rotor axis. A guide at the underside of the rotor embraces the sprinkler head. The cutters taper downwardly and inwardly toward a lower extension of the axis. It is stated that the rotor may be advanced downwardly for progressively trimming grass to an accurate dish-shape terminating at the periphery of the head. Contact of the cutters with an obstacle may result in damage thereto.

It is accordingly an object of the present invention to provide an attachment for trimming the grass around sprinkler heads without damaging the sprinkler heads or the attachment.

It is a further object of the present invention to provide such an attachment which is rugged, reliable, easy to use, and inexpensive to maintain.

In order to trim the grass in a wide path around sprinkler heads without damaging them or the trimming device, in accordance with the present invention, a member or body is provided which is rotatably mountable to the motor unit of a grass wacker or otherwise rotatable and to which is attached at its periphery one or more coils of wire with an end portion of the wire extending out from the coil so as to extend downwardly from the body to serve as a cutting blade and the coil serving as a spring biasing or urging the blade to the downward position but wherein the blade is movable toward a horizontal position when resistance such as a sprinkler head is encountered so that neither the sprinkler head nor the attachment is damaged. The blade is skewed relative to the vertical direction (when the body is in normal use for grass trimming) so as to extend radially inwardly, i.e., in a direction toward the rotational axis of the body, as well as downwardly so that by raising and lowering the body during cutting a wide band of grass may be cut around a sprinkler head.

The above and other objects, features, and advantages of the present invention will be apparent in the following detailed description of the preferred embodiment of the present invention when read in conjunction with the accompanying drawings wherein the sane or similar reference numerals denote the same or similar parts throughout the several views.

BRIEF DESCRIPTION OF THE DRAWINGS

FIG. 2 is a bottom view, partly schematic, of a grass wacker motor attachment which embodies the present invention.

FIG. 3 is an edge view thereof.

FIG. 4 is an exploded view of a cutter assembly therefor and a sectional view, taken along lines 4—4 of FIG. 2, of a portion of a rotatable member to which the cutter assembly is attached.

FIG. 5 is a side view of the cutter assembly attached to the rotatable member and with the cutter blade in cutting position.

FIG. 6 is a view similar to that of FIG. 5 of the cutter assembly attached to the rotatable member and with the cutter blade displaced from the cutter position due to encountering resistance of an object.

DETAILED DESCRIPTION OF THE PREFERRED EMBODIMENT

Figure 1:
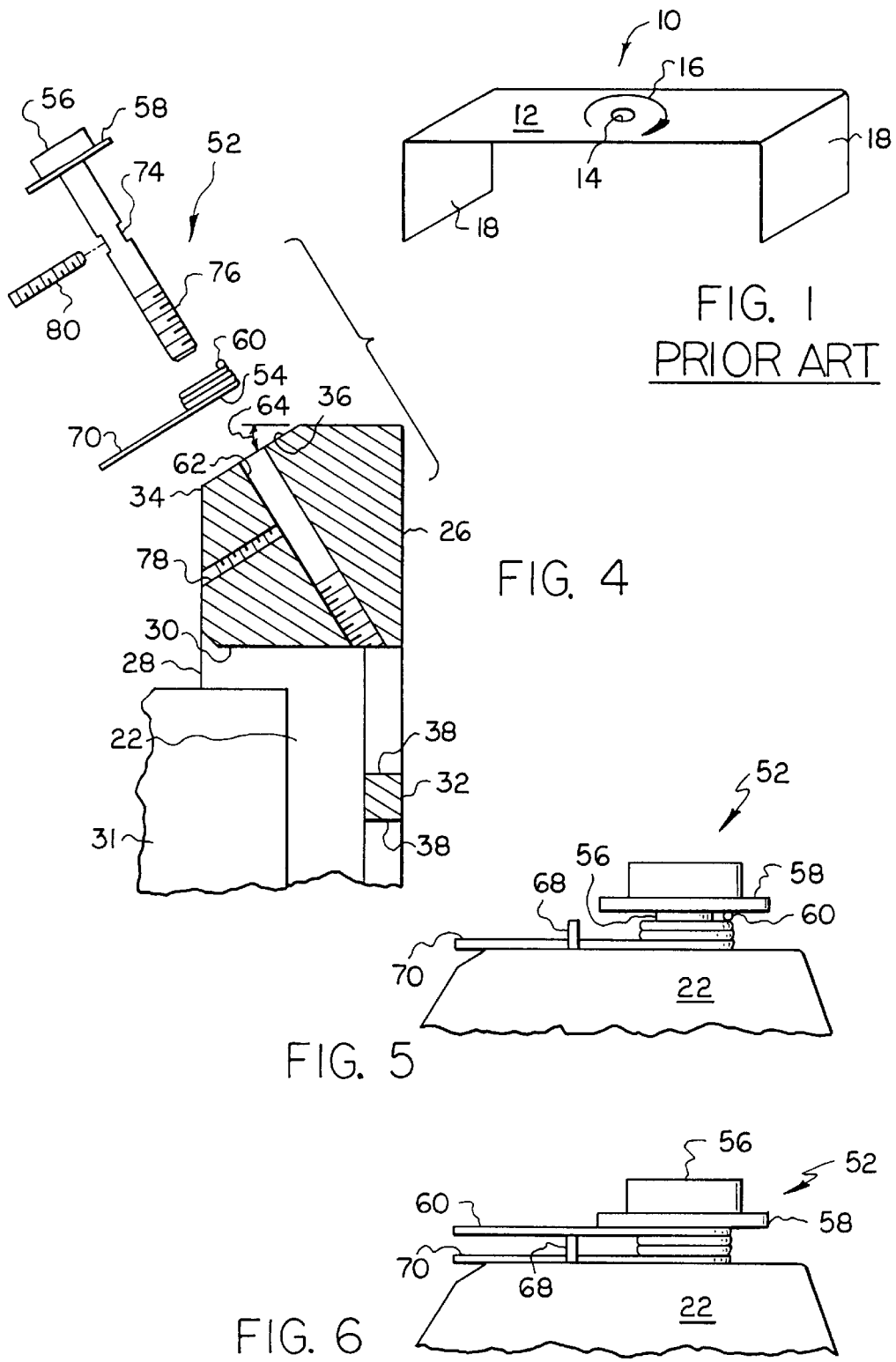
FIG. 1 is a schematic perspective view of a prior art around a sprinkler head. attachment to a grass wacker motor unit for trimming grass

Referring to FIGS. 2 to 6, there is shown generally at 20 a device which is attachable to a motor unit of a grass or weed wacker or the like for rotation for trimming grass around sprinkler heads. The attachment comprises a generally circular mounting plate or body 22 which is truncated at three spaced locations, illustrated at 24, equally spaced about its perimeter, leaving arcuate portions 26 circumferentially between the truncated portions 24. The bottom surface 28 of the plate 22 (the surface which faces the ground when the attachment 20 is in normal use for trimming grass around sprinkler heads) has a bore, illustrated at 30, which defines a relatively thin plate portion 32 and a relatively thick peripheral ring portion 34. The arcuate portions 26 are truncated adjacent the bottom surface to provide flat surfaces, illustrated at 36, for a reason which will be discussed hereinafter. The member 22 is preferably composed of aluminum (for example, 6061 aluminum) or other suitable material. The bore 30 is provided to lighten the member as well as to minimize contact between the rotating member and the sprinkler head, illustrated schematically at 31 in FIG. 4, as the member is held over the sprinkler head with the sprinkler head 31 at least partially received in the bore 30 and with the ring portion 34 generally surrounding the periphery of the sprinkler head for cutting. Thus, the bore 30 is sized to have a diameter which is slightly larger than that of the sprinkler head, for example, about 6 inches for a 5½ inch diameter sprinkler head. The member 22 may thus have different sizes with different diameter bores for different size sprinkler heads. In order to further lighten the member 22, holes, illustrated at 38 and 40, are provided in the plate and ring portions 32 and 34 respectively. For example, the thicknesses of the plate and peripheral ring portions 34 and 32 respectively may be about 1 inch and 5/16 inch respectively, and the diameter (untruncated) of the member 22 may be about 7.9 inches. These and any other dimensions provided herein are for exemplary purposes only and are not intended to be limiting of the invention. Alternatively, the member 22 may be composed of light weight plastic. It should be understood that the member 22 may have any other suitable shape as well as size, and such other shapes and sizes are meant to come within the scope of the present invention.

The mount has an axis of rotation, illustrated at 42, which is the axis of the bore 30. The plate portion 32 has a central aperture, illustrated at 44, the center of which is co-axial with the rotational axis 42. The member 22 is rotatably mountable to a motor unit, illustrated at 46, of a grass or weed wacker or the like by receiving an existing stud or shaft 48 of the motor unit in the aperture 44 (after the existing grass wacker cutter has been removed), and tightening an existing or other nut 50 thereon. However, the member 22 may otherwise be suitably mounted such as, for example, to a small motor so that it can easily be carried in a golf cart and dropped over a sprinkler head and operated without getting out of the golf cart.

A cutter assembly, illustrated at 52, is mounted on each of the arcuate portions 26. The member 22 is provided with a relatively thick ring portion 34 to provide the structure needed for mounting the cutter assemblies 52 and a relatively thin plate portion 32 to minimize weight. While three cutter assemblies 52 are shown on member 22, it should be understood that member can have any number of cutter assemblies 52. The cutter assemblies 52 should be placed so that the member 22 is balanced. Thus, if the member 22 were to be constructed to have a single cutter assembly, suitable steps should be taken to balance the member 22. For normal operation, the member 22 is positioned above a sprinkler head with the bottom surface 28 horizontal and facing the ground and with the ring portion 34 rotating about the sprinkler head and supporting the cutter assemblies 52 in position to cut the grass around the sprinkler head, as discussed hereinafter. The truncations 24 are provided so that the arcuate portions 26 project outwardly so that the ring portion does not interfere with the cutting process and so as to further lighten the member 22.

Referring to FIG. 4, each cutter assembly 52 includes a coil, illustrated at 54, of heavy gage wire (which may be composed of metal or other suitable material) such as, for example, stainless steel wire having a diameter of about 0.08 inch (which may be considered to be a suitable diameter for the lawn and soil conditions of a typical golf course in western Pennsylvania), which is mounted to member 22 by screw 56 and washer 58. The optimum size of the wire may vary depending on lawn and soil conditions. Both end portions of the coil 54 extend outwardly, for example, about 1¾ inches, from the coil, and one 60 of these end portions serves as a cutter blade.

The cutter blade 60 is mounted to extend axially downwardly from bottom surface 28 (in a direction toward the ground when the attachment 20 is positioned in normal use with the rotational axis 42 vertical for trimming grass around sprinkler heads) and in a radially inwardly direction, i.e., in a direction toward the rotational axis 42. Thus, while extending downwardly, the blade 60 extends radially inwardly a distance of, for example, about 1 inch thereby allowing a wide band of grass of a width of about 1½ to 2 inches to be trimmed by gradually raising and lowering the rotating member 22 along with some lateral movement that will occur naturally. The cutting of the grass at an angle as provided by angled blades 60 provides for more effective cutting than, for example, the cutting provided by the trimming attachment of FIG. 1 wherein the blades extend straight down. Since it is accordingly unnecessary to move the member 22 back and forth and since only minimal lateral movement would be expected, the chances of the rotating member 22 coming into contact with the sprinkler head and damaging it are reduced. Alternatively, an attachment may be devised wherein the cutter assemblies are mounted so that the blades extend radically outwardly. However, it is preferred that the blades extend radically inwardly since this allows the rotating ring portion 34 to be further from the sprinkler head so that the chances of damaging contact therewith are reduced.

In order to position the blade 60 at the desired angle, the surface 36 is truncated so that it is parallel to a plane containing blade 60. An aperture, illustrated at 62, is provided in this surface 36 to be normal thereto. This aperture 62 extends entirely through the ring portion 34, and its lower end portion is threaded. The lower end portion of screw 56 is also threaded. The washer 56 then coil 54 are received on the shank of screw 56, and the screw is then threadedly received in the aperture 62 whereby the blade 60 extends normal to the screw shank which is in turn normal to the surface 36. Thus, the desired orientation or angle, illustrated at 66 in FIG. 3, of the blade 60 is achieved by forming the surface 36 to the corresponding angle, illustrated at 64 in FIG. 4. These angles 64 and 66 may each be, for example, about 40 degrees.

The coil 54 is anchored against rotation about the screw shank by a pair of pins 68 which receive (capture) the other end portion 70 of the coil 54 there between. These pins 68 are spaced just enough apart for passage of the coil portion 70. The coil 54 is formed so that, during normal use when the blade is in cutting position, as seen in FIG. 5, the blade 60 is oriented at an angle of about 90 degrees relative to coil portion 70, and the pins 68 are positioned accordingly. Pins 68 are split spring pins which are compressed, fitted into their respective apertures, and released wherein they are held in the apertures by the spring force. However, it should be understood that other suitable means may be provided for anchoring the coil 54 from rotation.

During use of the trimmer 20, a sprinkler head may be accidentally struck by a blade 60. It is considered important that damage to the sprinkler head as well as the trimmer be prevented when this occurs. In order to prevent damage, in accordance with the present invention, the screw 56 is positioned so that there is enough play between the washer 58 and the coil 54 so as to allow the blade 60 to move from the cutting position illustrated in FIG. 5 to a position, as illustrated in FIG. 6, parallel or near parallel with coil portion 70, i.e., through an angle of about 90 degrees.

In order to precisely position the screw 56 to provide the amount of play needed between the washer 58 and the coil 54 to achieve the desired movement of the blade 60 upon encountering an obstacle, the screw shank has a circumferential slot, illustrated at 74, at a location thereon which is in the aperture 62 and above the screw threads 76. The ring portion 34 has a threaded aperture 78 which is normal to and which opens into aperture 62. A suitable set screw 80 is threadedly received within this aperture 78, and its end is receivable in slot 74 to precisely position the screw 56.

The member 22 should be rotatable, as illustrated at 72 in FIG. 2, so that the movement of the blade 60 due to an obstruction tightens the coil 54 about the shank of the screw 56. Otherwise, the coil 54 may be sprung and have to be replaced. Right and left handed coils may be provided for clockwise and counter-clockwise member rotation.

As the blade 60 wears, it will become shorter and have to be replaced. Instead of replacing the coil 54, the cutter assembly 52 may be disassembled and the coil 54 turned over so that the blade portion 60 is interchanged with the coil portion 70. Thus, the coil portion 70 becomes the new blade. Of course, when the coil portion 70 wears out, it will then be necessary to replace the coil 54. When a blade wears out, it may still extend from the coil 54 a distance of, for example, about ⅜ inch.

As illustrated at 82 in FIG. 3, the blades 60 may be positioned to define an inner diameter of trimming ring around a sprinkler head of, for example, about 6 inches, and, as previously discussed, this trimming ring may have a width, illustrated at 84, of, for example, about 1½ to 2 inches. Thus, a wide trimming ring is achievable with a single cutter on each cutter assembly.

It was indicated previously that it may take two persons using manual means all day to trim around the sprinkler heads for 9 fairways. By use of the attachment 20 of the present invention, this may be done by one person in perhaps ½ day for very substantial time savings, without damage to the sprinkler heads or the attachment 20 due to accidental contact with the blades.

It should be understood that, while the present invention has been described in detail herein, the invention can be embodied otherwise without departing from the principles thereof, and such other embodiments are meant to come within the scope of the present invention as defined by the appended claims.

What is claimed is:

1. Apparatus for trimming grass around a sprinkler head comprising a body including means defining a bore having an axis for disposing said body over a sprinkler head with the sprinkler head at least partially received in the bore during rotation of said body about said axis and further defining a peripheral portion, means for rotating said body about said axis, and at least one means attached to said peripheral portion for cutting grass as said body rotates about said axis adjacent the ground with a sprinkler head at least partially received within the bore, said cutting means comprising a wire having an end portion defining a cutting blade and an intermediate portion formed into a coil defining a spring.

2. Apparatus according to claim 1 wherein said end portion extends radially inwardly.

3. Apparatus according to claim 2 wherein said end portion also extends axially downwardly.

4. Apparatus according to claim 1 wherein said end portion extends axially downwardly and at an angle relative to said vertical axis.

5. Apparatus according to claim 1 wherein said cutting means is attached to said peripheral portion so that movement of said end portion due to an obstruction tightens said coil.

6. Apparatus according to claim 1 wherein said rotating means comprises means defining an aperture in said body for receiving a motorized shaft.

7. Apparatus according to claim 1 wherein said peripheral portion is generally circular, the apparatus comprising a plurality of said cutting means equally spaced around said peripheral portion, and means defining a plurality of truncated portions of said peripheral portion between said cutting means respectively.

8. Apparatus according to claim 1 wherein said peripheral portion comprises means for attaching said cutting means so that said wire end portion extends at a predetermined angle, said attaching means including means defining a truncated surface extending at an angle corresponding to said predetermined angle.

9. Apparatus according to claim 8 wherein said wire further has an other end portion, said attaching means further includes a screw to be received in said coil, means defining an aperture in said normal to said surface for threadedly receiving said screw, means for securing said screw in said aperture means while allowing play for the coil, and means for securing said other wire end portion.

10. Apparatus according to claim 1 wherein said wire further has an other end portion, said peripheral portion comprises means for attaching said cutting means, said attaching means includes a surface on said peripheral portion, a screw to be received in said coil, means defining an aperture in and normal to said surface for threadedly receiving said screw, means for securing said screw in said aperture means while allowing play for the coil, and means for securing said other wire end portion.

11. Apparatus according to claim 10 wherein said wire end portions are interchangeable whereby said other end portion may serve as a cutting blade when said cutting blade end portion has worn.

12. Apparatus for trimming grass comprising a body having a peripheral portion, means for rotating said body, and at least one means attached to said peripheral portion for cutting grass as said body rotates about a vertical axis adjacent the ground, said cutting means comprising a wire having an end portion defining a cutting blade and an intermediate portion formed into a coil defining a spring, said wire further having an other end portion, said peripheral portion including means for attaching said cutting means, said attaching means including a surface on said peripheral portion, a screw to be received in said coil, means defining an aperture in and normal to said surface for threadedly receiving said screw, means for securing said screw in said aperture means while allowing play for the coil, and means for securing said other wire end portion, and wherein said screw securing means comprises means defining a slot in said screw, a set screw, and means defining an aperture in said peripheral portion which extends normal to said screw receiving aperture for threadedly receiving said set screw for engaging said slot means.

13. Apparatus according to claim 12 wherein said slot extends circumferentially entirely around said screw.

14. Apparatus for trimming grass comprising a body having a peripheral portion, means for rotating said body, and at least one means attached to said peripheral portion for cutting grass as said body rotates about a vertical axis adjacent the ground, said cutting means comprising a wire having an end portion defining a cutting blade and an intermediate portion formed into a coil defining a spring, said wire further having an other end portion, said peripheral portion including means for attaching said cutting means, said attaching means including a surface on said peripheral portion, a screw to be received in said coil, means defining an aperture in and normal to said surface for threadedly receiving said screw, means for securing said screw in said aperture means while allowing play for the coil, and means for securing said other wire end portion, wherein said other wire end portion securing means comprises a pair of pins secured in said surface and spaced for receiving said other wire end portion between them.

15. Apparatus for trimming around a sprinkler head comprising a body including means defining a bore having an axis for disposing said body over the sprinkler head with the sprinkler head at least partially received within the bore during rotation of said body about said axis and further defining a peripheral portion surrounding the bore, means for rotating said body about said axis, and at least one means attached to said peripheral portion for cutting grass as said body rotates about said axis adjacent the ground with a sprinkler head at least partially received in the bore, said cutting means comprising a wire having an end portion defining a cutting blade which extends radially inwardly and axially downwardly from said peripheral portion.

16. Apparatus according to claim 15 wherein said cutting means is attached to said peripheral portion so that movement of said end portion due to an obstruction tightens said coil.

17. Apparatus according to claim 15 wherein said peripheral portion comprises means for attaching said cutting means so that said wire end portion extends at a predetermined angle, said attaching means including means defining a truncated surface extending at an angle corresponding to said predetermined angle.

18. Apparatus according to claim 15 wherein said wire further has an other end portion, said peripheral portion comprises means for attaching said cutting means, said attaching means includes a surface on said peripheral portion, a screw to be received in said coil, means defining an aperture in and normal to said surface for threadedly receiving said screw, means for securing said screw in said aperture means while allowing play for the coil, and means for securing said other wire end portion.

19. Apparatus according to claim 18 wherein said wire end portions are interchangeable whereby said other end portion may serve as a cutting blade when said cutting blade end portion has worn.

20. Apparatus for trimming around a sprinkler head comprising a body including means defining a bore for fitting said body over the sprinkler head with the sprinkler head at least partially received within the bore during rotation of said body and further defining a peripheral portion surrounding the bore, means for rotating said body, and at least one means attached to said peripheral portion for cutting grass as said body rotates about a vertical axis adjacent the ground, said cutting means comprising a wire having an end portion defining a cutting blade which extends radially inwardly and axially downwardly, wherein said wire further has an other end portion, said peripheral portion comprising means for attaching said cutting means, said attaching means including a surface on said peripheral portion, a screw to be received in said coil, means defining an aperture in and normal to said surface for threadedly receiving said screw, means for securing said screw in said aperture means while allowing play for the coil, and means for securing said other wire end portion, and wherein said other wire end portion securing means comprises a pair of pins secured in said surface and spaced for receiving said other wire end portion between them.

21. A method for trimming grass around a sprinkler head comprising the steps of (1) providing apparatus comprising a body including a bore having an axis and including a peripheral portion about the bore and the apparatus further comprising at least one cutter attached to the peripheral portion and including a wire having an end portion defining a cutting blade and an intermediate portion formed into a coil defining a spring, (2) disposing the body over the sprinkler head with the sprinkler head at least partially received in the bore, and (3) rotating the body about the bore axis while the sprinkler head is at least partially received within the bore to thereby effect trimming of the grass by the at least one cutter.

* * * * *